W. E. HOSCH.
CLOTH WINDING AND MEASURING MACHINE.
APPLICATION FILED JAN. 15, 1915. RENEWED FEB. 12, 1921.

1,390,957. Patented Sept. 13, 1921.
5 SHEETS—SHEET 1.

Witnesses
Wm. Janus
W. Smith

Inventor
Walter E. Hosch
By J. K. Ornwall, Att'y

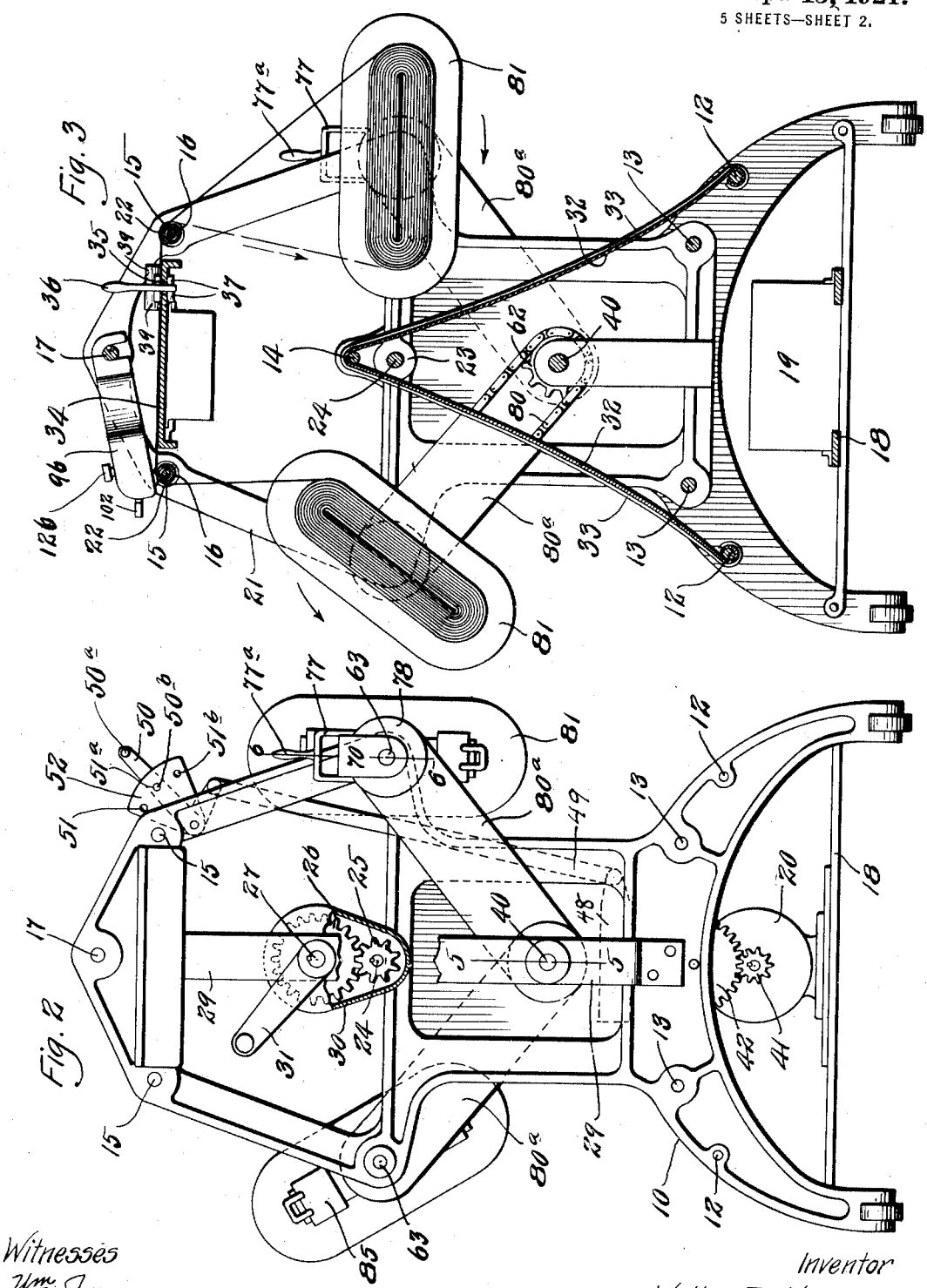

W. E. HOSCH.
CLOTH WINDING AND MEASURING MACHINE.
APPLICATION FILED JAN. 15, 1915. RENEWED FEB. 12, 1921.
1,390,957.
Patented Sept. 13, 1921.
5 SHEETS—SHEET 3.
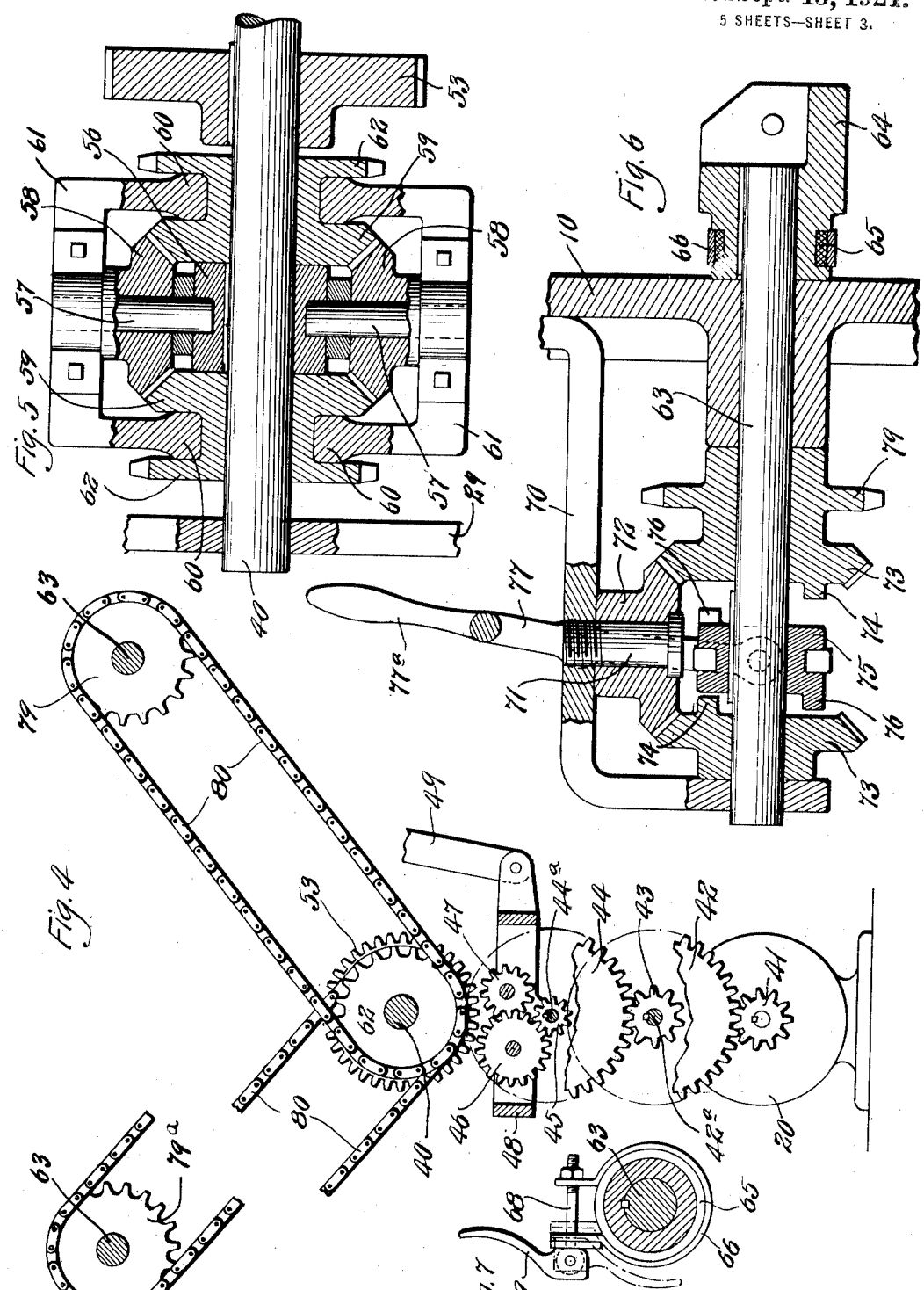
Witnesses
Inventor
Walter E. Hosch

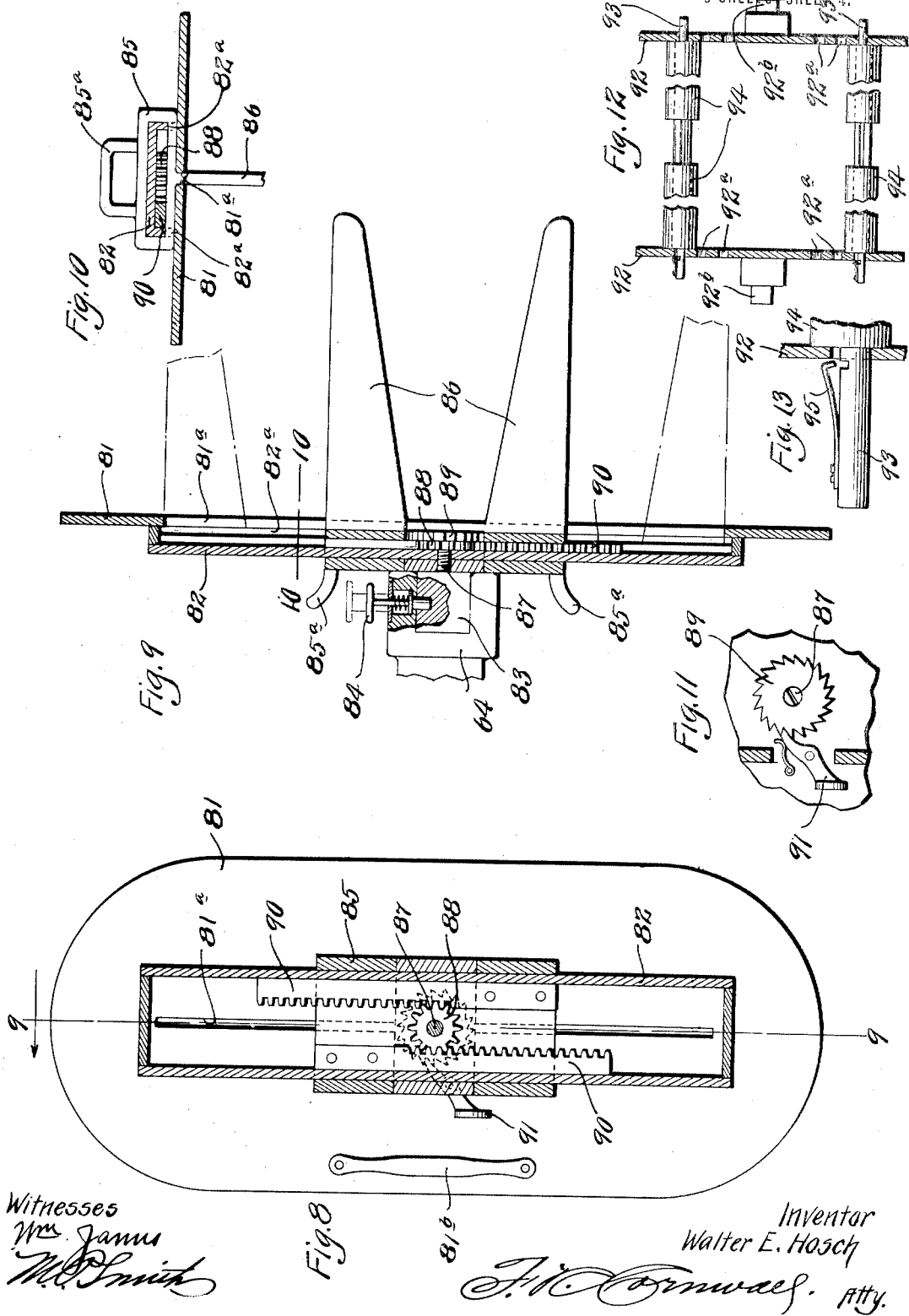

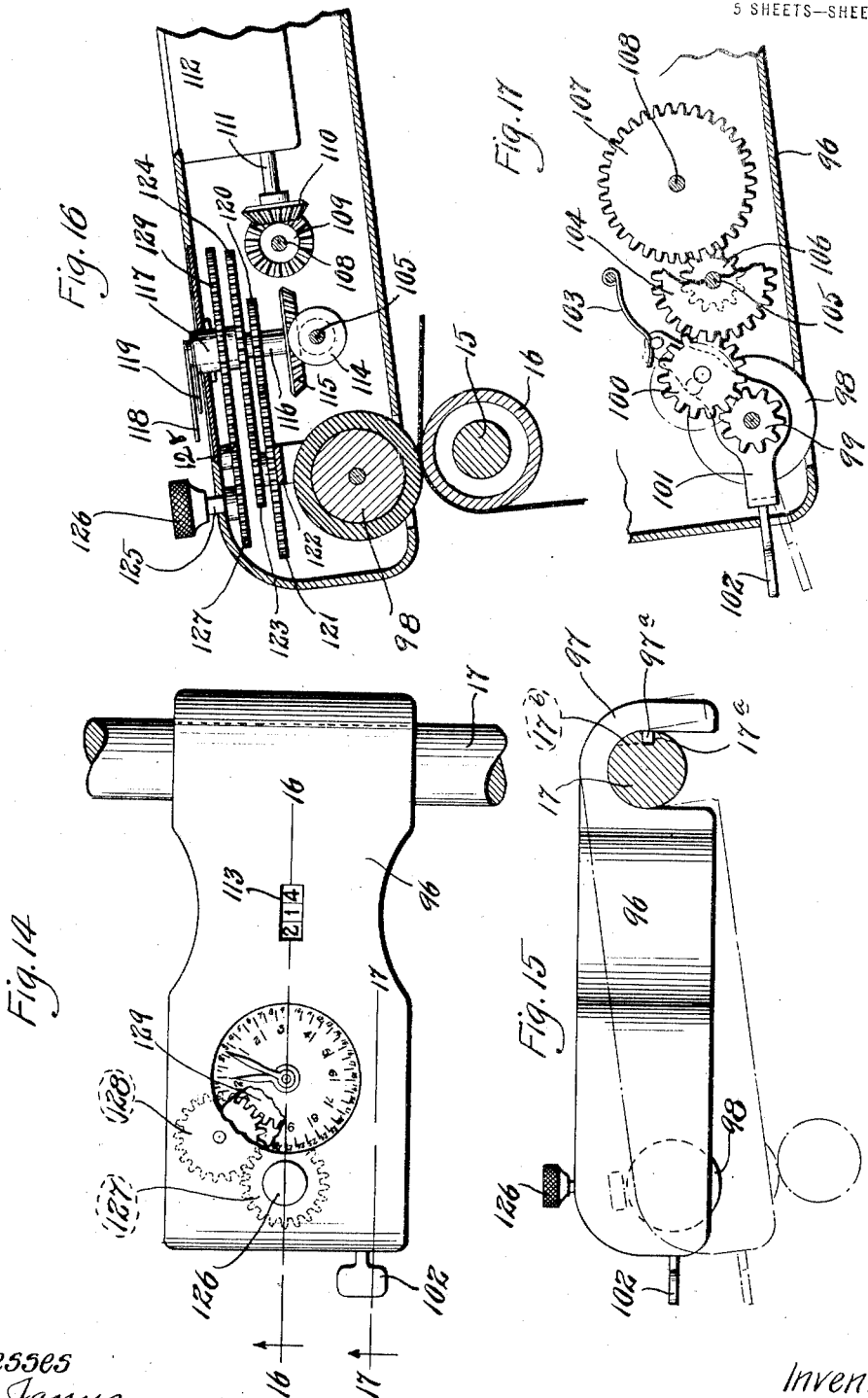

UNITED STATES PATENT OFFICE.

WALTER E. HOSCH, OF ST. LOUIS, MISSOURI, ASSIGNOR TO THE MEASUREGRAPH COMPANY, OF ST. LOUIS, MISSOURI, A CORPORATION OF MISSOURI.

CLOTH WINDING AND MEASURING MACHINE.

1,390,957.     Specification of Letters Patent.     Patented Sept. 13, 1921.

Application filed January 15, 1915, Serial No. 2,354. Renewed February 12, 1921. Serial No. 444,539.

*To all whom it may concern:*

Be it known that I, WALTER E. HOSCH, a citizen of the United States, residing at St. Louis, Missouri, have invented a certain new and useful Improvement in Cloth Winding and Measuring Machines, of which the following is a full, clear, and exact description, such as will enable others skilled in the art to which it appertains to make and use the same, reference being had to the accompanying drawings, forming part of this specification, in which—

Fig. 2 is an end elevational view of the machine.

Fig. 3 is a vertical section taken approximately on the line 3—3 of Fig. 1.

Fig. 4 is an enlarged detail view of the driving connections from the motor to the shafts carrying the devices which support the goods when the same is being wound and unwound.

Fig. 5 is an enlarged detail section taken approximately on the line 5—5 of Fig. 2.

Fig. 6 is an enlarged detail section taken approximately on the line 6—6 of Fig. 2.

Fig. 7 is an enlarged detail section taken approximately on the line 7—7 of Fig. 1.

Fig. 8 is a rear elevational view of one of the adjustable goods holding devices with parts thereof in section.

Fig. 9 is a vertical section taken approximately on the line 9—9 of Fig. 8.

Fig. 10 is a horizontal section taken approximately on the line 10—10 of Fig. 9.

Fig. 11 is a detail elevational view of a ratchet and pawl utilized in connection with the adjustable goods holding device.

Fig. 12 is an elevational view partly in section of a modified form of the goods holding device.

Fig. 13 is a detail view of a spring latch utilized in connection with the modified form of the goods holding device.

Fig. 14 is a plan view partly in section of the recording device forming a part of my improved machine.

Fig. 15 is a side elevational view of the recording device.

Fig. 16 is an enlarged vertical section taken approximately on the line 16—16 of Fig. 14.

Fig. 17 is an enlarged vertical section taken approximately on the line 17—17 of Fig. 14.

Figure 1:
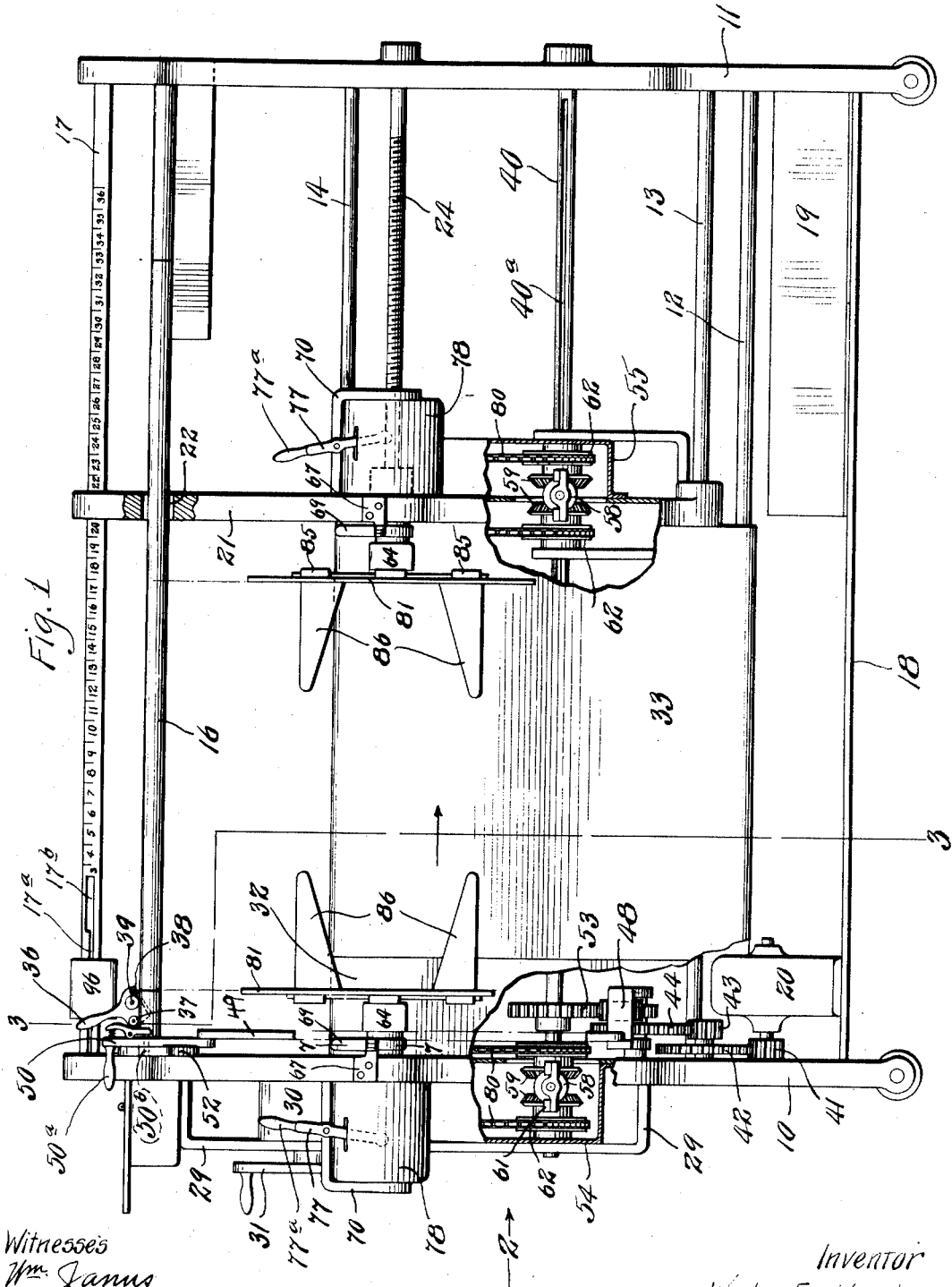
Figure 1 is a side elevational view of my improved machine, parts thereof being broken away in order to more clearly illustrate certain details of construction.

My invention relates to a machine particularly adapted for rolling, rerolling and measuring bolts of cloth or fabric of whatever width and thickness, either single or double fold, said machine being also adapted for cutting full length pieces of goods into sections of predetermined length, such as is done in mills and jobbing houses in making up assortments of goods.

It will be understood that in piece goods jobbing houses, factories or retail houses, there is a considerable amount of time and labor involved in rolling, rerolling and measuring bolts of cloth or fabric, and such work which must be done in taking stock or where sections of a large roll are measured off, rerolled and severed for delivery to purchasers; and it is an essential requirement that the goods be accurately measured and kept in proper shape during these operations.

The principal object of my invention is to provide a comparatively simple inexpensive machine which will be effective in saving time and labor incident to the rolling, rerolling and measuring of piece goods, and which machine will very rapidly and accurately perform the work required and deliver the wound and rewound goods in a neat and finished package.

The first essential in producing neat packages in the rolling, rerolling and measuring of piece goods is the centering of the bolt of cloth, so that it will wind and unwind in an absolutely straight line. It is the usual practice to wind piece goods on a center-board and if this board is not properly gripped and held in the winding mechanism, a continually increasing overlapping of the goods is produced, and this results in a very unsightly bolt of rewound goods.

Certain classes of goods have no center-board and it is one of the objects of my invention to provide in a cloth winding and measuring machine, self-centering devices which engage the bolts of cloth (with or without center-boards) and hold same so that they rotate accurately or in perfect alinement, thereby insuring perfectly rewound bolts or packages.

A further object of my invention is to provide a machine which can be readily adjusted for the accommodation of bolts of goods of different widths; further to combine with the winding machine a simple and accurate measuring device, and further, to provide a machine with a knife or cutting device which can be readily operated to sever the piece of goods which is engaged in the machine.

With the foregoing and other objects in view, my invention consists in certain novel features of construction and arrangement of parts, hereinafter more fully described and claimed.

Referring more particularly to the parts, 10 and 11 designate respectively, the front and rear uprights or end frames of the machine, the same being separable from each other and of skeleton form. Connecting the lower portions of these frames is a pair of rails 12, and above and adjacent these rails 12, is a pair of supporting rods 13.

Connecting the central portions of the end frames is a center rod 14 and connecting the upper portions of said frames are upper rails 15. Mounted to rotate freely on these rails 15 are sleeves or guide rollers 16, the same serving as anti-friction supports for the goods passing through the machine.

Connecting the upper ends of the end frames is a single rod or rail 17, the same being preferably provided with a scale of inches whereby the width of the goods passing through the machine may be readily ascertained.

Connecting the lower portions of the end frames is a skeleton platform 18 which serves as a support for a tool box 19 and a driving motor 20, the latter being positioned adjacent to the front end frame 10.

Mounted for sliding movement upon the rods 13 and 17 is a vertically disposed movable skeleton frame 21, the same being provided with openings 22 to accommodate the rollers 16 and formed in the central portion of this sliding frame is a threaded bearing 23 which receives and operates as a nut on a threaded shaft 24. The ends of this shaft are journaled in suitable bearings in the end frames 10 and 11, and fixed on said shaft adjacent to the end frame 10 is a pinion 25, Fig. 2, which meshes with a larger gear wheel 26, the same being fixed on a short shaft 27 which is journaled in a bracket 29 on the end frame 10.

The pinions 25 and 26 are inclosed in a suitable housing 30 and carried by the shaft 27 is a crank handle 31, which crank handle is manually operated and through the medium of the gears 25 and 26 screw shaft 24 is rotated to move sliding frame 21 backward and forward with respect to front end frame 10.

An inverted V-shaped housing in the form of an apron section 32, Fig. 3, of sheet metal overlies the rod 14 to the rear of end frame 10 and the lower ends of this housing are connected to rails 12. A second inverted V-shaped apron section 33 of sheet metal has its rear end attached to the sliding frame 21 and the free edges of said housings overlap and telescope with each other. These apron sections extend from each frame member and inclose machine parts of the operating mechanism that lie between the upright frame members and serve to form a screen to prevent the piece goods from becoming engaged in the mechanism, if for any reason the piece goods should be disengaged from the reels or supporting socket.

Fixed to the upper portions of end frames 10 and 11 is an elongated longitudinally extending table 34, the top surface of which is in direct horizontal alinement with the tops of the rollers 16 which extend longitudinally at the edges of the table, and the goods passing through the machine travels over the top of this table.

Formed in said table adjacent to the right hand edge thereof is a longitudinally disposed slot 35 extending substantially throughout the length of the table, and through which operates the device utilized for severing the goods. This device comprises a handle 36, the same occupying an inclined position so that its lower end projects through the slot 35 above and below the table 34, and mounted on the lower portion of said handle are rollers 37 which during operation bear against the upper and lower surfaces of the table.

Detachably positioned in the lower portion of the handle 36 is a thin flat blade 38 and journaled on the lower portion of the handle 36 in front of the upper pair of rollers 37 is a pair of large rollers 39, the same being adapted to ride on top of the table 34 and grip the goods immediately adjacent to the sides of the slot therein and immediately above the cutting edge of the blade 38.

The rear end of a shaft 40 is journaled in rear end frame 11 and the forward end of said shaft is journaled in bracket 29 which is positioned on end frame 10. This is the main driving shaft of the transmission mechanism of the machine and positioned thereupon are the differential gears which transmit motion to the reels or rotating sockets which carry the goods engaging frames.

I provide a motor to drive the cloth winding reels in either direction. The driving mechanism, that is, the connections, see Fig. 4, from the motor to this shaft 40 include a pinion 41 which is fixed on the motor shaft and gear wheel 42 with which said pinion 41 meshes, said gear wheel being mounted on a stub shaft 42ª, Fig. 4, and said shaft carrying a pinion 43 which meshes with a gear wheel 44, the same being mounted on a stub shaft 44ª. Fixed on this stub shaft is a pinion 45, and I provide a two-way drive device at this point, including pinions 46 and 47, the same being in mesh with each other and being mounted on shafts which are journaled in a horizontally disposed rocking frame 48 which is mounted for occasional rocking movement upon the stub shaft 44ª.

Pivotally connected to the right hand end of frame 48 is the lower end of a link 49, the upper end thereof being connected to the short arm of a bell crank 50, Fig. 2, the same being fulcrumed to the right hand side of end frame 10, and the long arm of said bell crank lever is provided with a handle 50ª and a spring pressed pin 50ᵇ, which latter is adapted to engage in any one of a series of three apertures 51, 51ª, and 51ᵇ, the same being formed in a segment plate 52 which is fixed on the end frame 10.

Fixed on shaft 40 immediately above the pinions 46 and 47 is a gear wheel 53, and when handle 50 is in neutral position with the pin 50ᵇ in the central aperture 51ª, frame 48 occupies a horizontal position as seen in Fig. 4 with the pinions 46 and 47 disengaged from gear wheel 53.

When this frame is rocked in one direction pinion 47 will engage with gear wheel 53 and when rocked in the opposite direction pinion 46 will be engaged with said gear wheel 53. This driving connection is for the purpose of imparting rotary movement in either of two directions to the goods carrying heads. I provide differential mechanism for driving both reels, and preferably all of the reel-heads including those on the movable frame, in any adjusted position of the movable frame. I shall now describe this differential mechanism. Arranged between bracket 29 and the end frame 10 is a housing 54, Fig. 1, and positioned therein and upon the shaft 40 is a differential gearing which is utilized for transmitting rotary motion to the two reels, in the present instance to the shafts which carry the sockets for the goods engaging devices which are positioned adjacent to said end frame 10.

Carried by the sliding frame 21 is a housing 55 which corresponds to the housing 54 and arranged in said housing 55 is a differential which is in every way similar to the differential at the forward end of the machine, but as frame 21 is arranged to slide lengthwise of the machine, the differential that is located within housing 55 must be mounted for sliding movement upon shaft 40, and to this end said shaft is provided with a longitudinally disposed slot or key-way 40ª. The differential in housing 54 comprises a block or collar 56, Fig. 5, which is rigidly fixed on shaft 40 and seated in and projecting outwardly from said collar in opposite directions are shafts 57 upon which are journaled beveled pinions 58. Meshing with these pinions and loosely mounted upon shaft 40 are beveled pinions 59, the hubs of which are loosely mounted in bearings 60, the same being formed on a frame 61 which latter serves as bearings for the outer ends of shafts 57.

Formed integral with or fixed to the hubs of pinions 59 and outside the frame 61 are sprocket wheels 62. It will be understood that in the differential gearing which is positioned within housing 55 the block or collar 56 is provided with a key which slides freely through key-way 40ª in shaft 40.

Journaled in suitable bearings on both sides of the central vertical axis of frame 10 and sliding frame 21 are short longitudinally disposed shafts 63, Fig. 6, and fixed on the inner ends of these shafts are sockets 64 which are adapted to receive lugs or blocks that are carried by the goods engaging devices hereinafter more fully described.

Seated in the hubs of the sockets 64, see Fig. 6, are friction rings 65 and bearing thereupon are brake bands 66, the same being carried by brackets 67, Fig. 1, which latter are positioned on the sides of frames 10 and 21. Passing through the ends of each brake band 66 is a bolt 68, Fig. 7, and mounted upon one end thereof is a hand lever 69, having an eccentric head which when said handle is swung from one position to another moves the ends of the brake band toward each other as shown by dotted lines in Fig. 7, thereby gripping the friction ring 65 and consequently restraining the socket 64 and its shaft against free rotary movement. Associated with the reel heads of the receiving reel, I provide reversing means for independently reversing the direction of their rotation. This will now be described.

Fixed to the frames 10 and 21 immediately above the shafts 63 on the right hand side of the machine are brackets 70, the outer ends of which serve as bearings for the outer ends of said shafts 63 and seated in each bracket above the corresponding shaft is a pin 71, Fig. 6, on which is loosely mounted a beveled pinion 72. Loosely mounted on the corresponding shaft 63 and meshing with this pinion 72 are beveled pinions 73 each provided on its inner face with one or more lugs 74.

Mounted to slide lengthwise upon and to rotate with each right hand shaft 63 between the beveled pinions 73 is a clutch member in the form of a collar or block 75 provided on its side faces with lugs 76 which are adapted to engage the lugs 74, and this collar 75 is shifted lengthwise upon the shaft 63 by means of a yoke 77, the same being pivotally mounted on the corresponding bracket 70 and having an operating handle 77$^a$. Each of the sets of gearing just described is inclosed in a suitable housing 78, the same being slotted longitudinally to accommodate the yoke 77 and handle 77$^a$.

The hub of one of the beveled pinions 73 of each set of gearing is provided with a sprocket wheel 79, and connecting each sprocket wheel 79 with a corresponding sprocket wheel 62 of the differential gearing is a sprocket chain 80.

The pair of shafts 63 on the left hand side of the machine are not provided with the clutches just described, but each of the left hand shafts carries a sprocket wheel 79$^a$ which corresponds to the sprocket wheel 79, and which is driven by a chain 80 from one of the sprocket wheels 62. The chains 80 are inclosed in suitable housings 80$^a$.

The reels or devices which engage the bolts of goods will now be described. (See Figs. 8 to 13 inclusive.)

Each reel or goods holder comprises two axially alining reel heads, each consisting of an elongated oval plate 81 see Figs. 9 and 10 in which is formed a centrally arranged longitudinally extending slot 81$^a$ and located on the back of said plate is an elongated rectangular housing 82, the walls of which are provided with longitudinally extending slots 82$^a$.

Fixed to the center of the housing 82 and projecting rearwardly therefrom is a block or lug 83 which is adapted to engage in any one of the sockets 64 and to lock the lug or block in said socket the latter is provided with a spring-actuated pin 84 which is adapted to engage in a recess formed in the side of said lug or block 83.

The inner portions of rectangular loops 85 pass through the slots 82$^a$ in the housings 82, see Fig. 10, and each of said loops carries an elongated plate or finger 86, the same projecting through the slot 81$^a$ in plate 81.

The outer portions of the loops 85 are provided with rings or handles 85$^a$ whereby they may be engaged and moved lengthwise of the housing 82 and plate 81.

Centrally arranged within the housing 82 is a pin 87 and loosely mounted thereupon is a pinion 88 to which is fixed a ratchet wheel 89. Fixed to the inner portion of each loop 85 and extending lengthwise in opposite directions within the housing 82 are rack bars 90, the teeth of which engage the pinion 88. The teeth of the ratchet wheel 89 are engaged by the point of a spring-pressed pawl 91, and thus said ratchet wheel and the pinion 88 are normally held against rotary movement in one direction.

Each plate 81 is provided on its outer face with a handle 81$^b$ which is adapted to be grasped when a bolt of goods is being placed in or removed from the machine.

A modified construction of the reels or bolt engaging devices is illustrated in Figs. 12 and 13, said construction comprising plates 92, the same being provided with apertures 92$^a$ which are located at different distances from the centers of said plates, and said apertures being adapted to receive pins 93 on the ends of rods or rollers 94, which latter extend from one plate to the other and the pins at one end being provided with spring latches 95 which serve to retain the rods or shafts in proper position on the plates 92. These plates 92 correspond with the plates 81 and are provided with lugs or blocks 92$^b$ which are adapted to engage in the sockets 64.

The measuring mechanism of my improved machine will now be described. (See Figs. 14 to 17 inclusive.)

A box-like housing 96 is provided at its rear end with a hook 97 which is adapted to engage over the rod 17 and extending inwardly from the rear portion of said hook is a pin 97$^a$ which engages in a longitudinally disposed slot 17$^a$ in said rod 17, and formed in said rod at the rear end of said slot is a notch 17$^b$ into which the pin 97$^a$ passes when the measuring device is in engagement with the cloth or fabric passing through the machine.

When the pin 97$^a$ is in the slot 17$^a$ the housing 96 is held in horizontal position with its free end elevated above the path of travel of the goods passing over the rollers 16 and table 34.

Journaled for rotation in the forward end of the housing 96 is a rubber faced roller 98, the lower portion of which projects through an opening in the bottom of the housing and the circumference of this roller is of predetermined length, for instance, one-eighth of a yard or four and a half inches. When the measuring device is lowered for operation this roller bears directly upon the goods passing over the left hand one of the rollers 16. (See Fig. 16.)

Fixed on the right hand end of the shaft which carries the roller 98 is a pinion 99, the same meshing with a pinion 100, which latter is carried by a tilting arm 101, the same being pivotally mounted on the shaft of roller 98 and provided with a handle 102 which projects through an opening in the front of housing 96. The rear end of arm 101 is pressed downward by a spring 103 so that the teeth of pinion 100 mesh with the teeth of a pinion 104, the same being fixed on a shaft 105, the ends of which are journaled in the side walls of the housing.

When handle 102 is moved downward to tilt arm 101, pinion 100 is disengaged from pinion 104. Fixed on shaft 105 is a pinion 106 which meshes with a larger pinion 107, the same being fixed on a shaft 108, which latter is journaled in the side walls of the housing 96. This shaft 108 carries a beveled pinion 109 which meshes with corresponding pinion 110, the latter being carried on a shaft 111 which extends into and is connected to a suitable counting mechanism 112 of the type employing a number of small disks bearing numbers on their peripheries and which numbers are readily discernible through an opening 113 in the top of housing 96. This counting and recording mechanism forms no part of my invention, but may be of any of the well known devices now in general use.

Fixed on shaft 105 is a beveled pinion 114 which meshes with a beveled pinion 115, the same being carried on the lower end of a shaft 116, which latter is vertically disposed within the housing and has bearing in a sleeve 117, which latter is arranged for rotation in a bearing formed in the top of the housing.

Located on top of the housing around the bearing for the sleeve 117 are concentric dials, the outer one of which is provided with graduations numbered from 1 to 36 inclusive and intended to indicate inches while the inner dial may be provided with graduations numbered from 1 up to 12 or more and intended to designate yards.

The upper end of shaft 116 carries a hand or pointer 118, the outer end of which traverses a path above the outer or inch indicating dial and carried by the sleeve 117 is a shorter hand or pointer 119, the outer end of which traverses a path above the inner or yard indicating dial.

Fixed on shaft 116 immediately above pinion 115 is a pinion 120 which meshes with a larger pinion 121, the same being mounted for rotation on a shaft having a bearing on a bracket 122 and fixed on this last mentioned shaft is a comparatively small pinion 123 which meshes with a larger pinion 124, the same being fixed on the lower end of sleeve 117.

The various pinions just described are of such size as to move the yard indicating hand 119 the distance of one graduation on the yard indicating dial, while the inch indicating finger 118 is making a complete revolution. The gearing to the recorder 112 is arranged to operate the same so that the numbers on the edges of the disk forming a part of said indicating mechanism show the total number of yards through the opening 113.

The means utilized for restoring the hands 118 and 119 to zero position comprises a short shaft 125 which is journaled in the top of the housing, said shaft being provided on its upper end with an operating thumb head 126 and on its lower end with a pinion 127 which latter meshes with an idle pinion 128, and the latter meshing with a pinion 129, the same being fixed to sleeve 117.

The operation of my improved machine is as follows:

To properly space the sockets 64 the operator standing at the front end of the machine manually engages crank handle 31 Fig. 2 and operates the same to transmit proper motion to screw rod 24, and said screw rod operating in the threaded bearing or nut 23, moves sliding frame 21 toward or away from end frame 10 as the case may be. During this movement the block or collar 56 of the differential occupying housing 55 slides along shaft 40.

The operator now takes the bolt of cloth which is to be measured and applies to the ends thereof a pair of the goods holding devices comprising the plates 81 and adjustable fingers 86. These fingers are inserted in the ends of the bolt of goods at the center thereof and immediately adjacent to the center-board or where the goods is not provided with said center-board said fingers are inserted between the folds at the center of the goods.

In order that said fingers 86 may properly grip the goods, the same are moved outward away from each other so far as possible or until they engage the center of the goods with considerable pressure, which movement is accomplished by pulling outwardly on the handles 85ª, and during such movement the rack bars 90 engage the pinion 88, thus insuring uniform movement of the fingers 86.

The pawl 91 engaging the teeth of ratchet wheel 87 locks the parts in their adjusted position and holds the fingers 86 firmly in the ends of the bolt of goods. The lugs or blocks 83, Fig. 9, of the goods holding devices are now inserted in the sockets 64 on the left hand side of the machine, said lugs or blocks being locked in said sockets by the corresponding spring held pins 84.

A few folds of the goods from the bottom are now unwound and the end of the unwound portion of the goods is drawn upward over the left hand roller 16, Fig. 3, and thence across the table 34 to the slot 35, this being considered as the starting point and the line along which the goods is severed when a bolt is being being cut up into sections. This slot is located a predetermined distance from the left hand roller 16, as for instance, nine inches, and consequently at the start of the measuring operation, the friction roller 98, Fig. 16, of the measuring device must be actuated until the measuring finger 118 indicates nine inches on the outer dial.

The rollers 16 are preferably provided with ball bearings in order to facilitate the passage of the cloth from one reel to another and to reduce friction between the goods and said rollers.

In winding and unwinding double fold goods the tendency of the lower fold or under-ply of the goods to be retarded is entirely overcome by arranging the ball bearing rollers to support said goods at both sides of the table. Thus, double fold goods retains its original shape, that is, the upper and lower folds retain their relative positions and there is no tendency of one fold to shift relative to the other as is the case where the goods is hand-rolled.

When the end of the cloth is placed at the slot 35, the measuring device comprising the housing 96 and parts carried thereby is moved lengthwise upon the rod 17 until the pin 97$^a$ occupies the notch 17$^b$, Figs. 1 and 15, and this permits the free end of the housing 96 to move downward until the friction roll 98 rests upon the goods at the point where the same passes over the left hand roller 16. The free end of the goods is now drawn downward over the right hand roller 16 and wrapped around the reel at the right hand side of the machine, which reel comprises a pair of the goods holding devices in which is positioned a center-board.

The handles 69, Fig. 7, coöperating with the brake bands 66 on the right hand side of the machine are now released to permit the right hand reel to operate freely while the handles 69 coöperating with the reel on the left hand side of the machine are operated to tighten the brake bands, thereby creating friction on the reel from which the goods is unwound, thus creating tension in the subsequent winding operation and causing the goods to wind in a taut condition upon the right hand reel.

The motor 20 is now started and through the train of gears 41, 42, 43, 44 and 45 rotary motion is imparted to pinions 46 and 47, Fig. 4, the same being carried by tilting frame 48. The operator now unlocks handle 50, Fig. 2, and swings same from neutral position downward or until pin 50$^b$ engages in aperture 51$^b$. This action tilts frame 48 so that pinion 46 is engaged with gear wheel 53 and as a result, shaft 40 is rotated and rotary motion is transmitted through sprocket chains 80 to all of the short shafts 63 carrying the sockets 64.

In unrolling goods from a bolt positioned in the left hand reel, which is the supply reel, said reel operates anti-clock-wise or in the direction indicated by the arrow adjacent said left hand reel in Fig. 3, and where single fold goods is being wound onto the receiving reel, that is, right hand reel, the latter also operates anti-clock-wise with the single fold goods passing onto said reel in the direction indicated by dotted lines in Fig. 3. This movement is required in order to bring the right or finished side of the goods on the outside of the rerolled package. Where double fold goods is to be wound onto the right hand reel, the left hand reel would rotate the same as for single fold, but the direction of movement of the right hand reel would be reversed by manipulation of the handles 77$^a$ Fig. 6, which shift the clutch members 75 from one pair of beveled pinions 73 to the other, which would rotate the right hand reel clockwise. At any time, in case the cloth is not winding properly, the cloth can be wound back toward the supply reel at the left by shifting the frame 48 to its opposite extreme position.

One of the principal features of my improved machine is the differential gearing utilized for transmitting the rotary motion of shaft 40 to the short shafts 63, said differential gearing being in the nature of a compensating mechanism and designed particularly for absorbing all irregularities of the unwinding and winding bolts of goods, and particularly the variation in the relative sizes of the bolts of goods formed by the winding and unwinding thereof.

The motion from shaft 40 is transmitted through hubs or collars 56 to the pairs of pinions 58 and from thence to the pinions 59 with which are formed integral the sprocket wheels 62. In order to reverse the motion of the reels in this way, the handle 50 is swung upward so that pin 50$^b$ is located in the upper aperture 51 and this movement tilts frame 48 so that pinion 47 is engaged with gear wheel 53 and rotary motion from shaft 44$^a$ is now transmitted through pinions 45, 46 and 47 to gear wheel 53, which latter is fixed on shaft 40.

The form of goods holding device illustrated in Figs. 12 and 13 is particularly adapted for use when it is desired to measure off and sever short lengths of goods from a large bolt.

If it is desired to wind the goods onto a center board, evidently the center board can be laid flat against the sides of the plates or fingers 86, and the cloth wrapped about it.

In the winding and unwinding of cloth in my improved machine the plates 81 act as guides to produce even edges at the ends of the bolt of rewound goods. In detaching the goods holding devices, it is only necessary to release pawl 91 and move the fingers 61 toward each other by pressure applied to handles 85$^a$.

During the movement of the goods over the left hand roller 16, the friction roller 98 travels upon the surface of said goods and the rotary movement of said roller is transmitted to the hands 118, and 119 and the wheels of the recording mechanism 112 through the various trains of gearing within the housing 96, and an operator standing at the front end of the machine can readily observe the dials and consequently ascertain the exact amount of goods which has passed through the machine.

To reset the fingers 118 and 119, the operator engages handle 102, Fig. 17, and moves the same downward, thereby disengaging pinion 100 from pinion 104 after which disk 126 is engaged to rotate pinions 127 and 129, the continued operation of which brings said fingers back to zero position.

When it is desired to sever the goods, the operator engages handle 36 and moves the same forward over the table during which time the large rolls 39 bear upon the goods on top of the table to the sides of the slot therein and holds said goods firmly at both sides of the point which is engaged by the blade 38, and thus a clean cut is made.

A machine of my improved construction is comparatively simple, can be operated with comparatively little power, saves much time and labor in the rolling, and rerolling of piece goods, accurately measures the goods which is being rolled and rerolled, and produces neat and finished packages.

It is understood that the embodiment of the invention described herein is only one of the many embodiments my invention may take, and I do not wish to be limited in the practice of my invention nor in my claims, to the particular embodiment set forth.

I claim:

1. In a machine of the class described, the combination of a frame, a supply reel and a receiving reel supported thereby, transmission mechanism for imparting movement to said reels, driving mechanism including a manually controlled two-way driving device connecting with said transmission mechanism for driving said reels from said driving mechanism in either direction, and manually controlled reversing means associated with said receiving reel for reversing the direction of rotation of the receiving reel independently of the supply reel.

2. In a machine of the class described, the combination of a frame, a supply reel comprising two co-axial reel heads rotatably supported in said frame, a receiving reel comprising two co-axial reel-heads rotatably supported in said frame, transmission mechanism including differential driving means for differentially driving the supply reel and the receiving reel, and driving mechanism including a manually controlled two-way driving device connecting with said transmission mechanism for driving said reels in either direction.

3. In a machine of the class described, the combination of a frame, a supply reel comprising two co-axial reel-heads rotatably supported in said frame, a receiving reel comprising two co-axial reel-heads rotatably supported in said frame, driving mechanism including a two-way driving device, transmission mechanism connected therewith for driving said reels in either direction from said driving mechanism, and reversing means associated with said receiving reel for independently reversing the direction of rotation of the receiving reel.

4. In a machine of the class described, the combination of a frame, a supply reel comprising two co-axial reel-heads rotatably supported in said frame, a receiving reel comprising two co-axial reel-heads rotatably supported in said frame, transmission mechanism, driving mechanism including a two-way driving device comprising a rocking frame and gears carried thereby for connecting with said transmission mechanism for driving said reels in either direction, and reversing means associated with said receiving reel for independently reversing the directon of rotation of the receiving reel.

5. In a machine of the class described, the combination of a frame, a transmisson shaft rotatably mounted in said frame, a motor connected with said shaft to drive said shaft in either direction, a supply reel and a receiving reel rotatably supported in said frame and rotatable from said transmission shaft, and reversing means associated with said receiving reel for independently reversing the direction of rotation of the receiving reel.

6. In a machine of the class described, the combination of a pair of separable frame members, reels located between said frame members and rotatably supported thereby, driving mechanism for said reels including machine parts located between said frame members, an apron section extending from each of said frame members toward the opposite frame member, said apron sections overlapping each other at their free edges and thereby forming a screen to protect the cloth passing between said reels, from said machine parts.

7. In a machine of the class described, the combination of a pair of end frames, an elongated table connecting the said end frames, a movable frame supported between said end frames, means supported at said end frames for moving said movable frame to adjust the same longitudinally of said table between said end frames, reel-heads rotatably mounted in one of said end frames, and other reel-heads co-axial therewith rotatably counted in said movable frame, means for driving all of said reel-heads in any adjusted position of said movable frame, and guide rollers extending longitudinally at the edges of the table between said end frames for guiding the cloth across the table.

8. In a machine of the class described, the combination of a pair of end frames, an elongated table connecting the said end frames, a movable frame supported between said end frames, means supported on said end frames for moving said movable frame to adjust the same longitudinally of said table between said end frames, reel-heads rotatably mounted in one of said end frames, and other reel-heads co-axial therewith rotatably mounted in said movable frame, a drive shaft extending between said end frames, means carried on the movable frame for imparting movement to the reel-heads that are carried by the movable frame, from said drive shaft, and means for driving the other reel-heads.

9. In a machine of the class described, the combination of a frame, a pair of reels each comprising a pair of co-axial reel heads mounted for operation therein, a pair of said reel-heads being adjustable lengthwise of the machine, a shaft, means for driving the same, two sets of differential gearing on said shaft, one set of said differential gearing being adjustable toward and away from the other set, and driving connections from both sets of differential gearing to the reel heads.

10. In a machine of the class described, the combination of a frame, a pair of reels arranged for operation therein, each reel comprising a pair of separate goods-engaging members, one member of each pair being adjustable toward and away from the other member, a driving shaft journaled in the frame, two sets of differential gearing on said driving shaft, one gearing being adjustable toward and away from the other, and driving connections from said gearing to the goods engaging members of the reels.

11. In a machine of the class described, the combination of a frame, a pair of reels each comprising a pair of coaxial reel heads arranged for operation therein, a pair of said reel heads being adjustable lengthwise of the machine, and means for simultaneously and uniformly driving said reel heads, which means includes two sets of differential gearing, one of which sets is adjustable toward and away from the other.

12. In a machine of the class described, the combination of a frame, pairs of shafts journaled for rotation therein, one pair of which shafts is adjustable toward and away from the other pair, bolt-goods-engaging members connected to said shafts, means including two sets of differential gearing for simultaneously driving the shafts, one of which sets is adjustable toward and away from the other set, and means for controlling the direction of rotation of said shafts.

13. In a machine of the class described, the combination of a fixed frame, an adjustable frame, a pair of shafts arranged for operation in each frame, bolt-goods-engaging members adapted to be connected to said shafts, and means including two sets of differential gearing for simultaneously rotating said shafts.

14. In a machine of the class described, the combination of a fixed frame, an adjustable frame, a pair of shafts arranged for operation in each frame, bolt goods engaging members adapted to be connected to said shafts, means including two sets of differential gearing for simultaneously rotating said shafts, one of which sets of differential gearing is movable with the adjustable frame, and means for controlling the direction of movement of said shafts.

15. In a winding machine of the class described, the combination of goods engaging reels, each comprising a pair of coaxial reel heads adjustable lengthwise of the machine, means for driving said reel heads including differential gearing for compensating for any irregular movement between the reels, and means for controlling the direction of rotary movement imparted to either reel.

16. In a machine of the class described, the combination of a fixed frame, a movable frame, means for moving the movable frame toward and away from the fixed frame, a shaft rotatably mounted in said fixed frame and extending through said movable frame, a pair of shafts journaled in each frame, having engaging means for engaging bolts of goods to support the bolts of goods between said frames, and means for simultaneously driving said pairs of shafts from said first named shaft.

17. In a winding machine of the class described, the combination with a pair of reels, of means for driving said reels, a differential gearing associated with said driving means, and means associated with said driving means having one position for driving said reels in one direction, and another position for driving said reels in the other direction.

18. In a machine of the class described, the combination of a frame, a pair of longitudinally extensible reels comprising adjustable separable reel heads rotatably supported in said frame, two sets of differential gearing, means for supporting one of said sets of differential gearing to enable the same to be adjusted toward and away from the other set, and means for simultaneously driving said reel heads from both of said sets of differential gearing.

19. In a machine of the class described, the combination of two opposite frame members, a supply reel head rotatably supported at one of said frame members, another supply reel head alining with said first named reel head and rotatably supported in the other frame member, a receiving reel head rotatably supported in one of said frame members, another receiving reel head alining with said first named receiving reel head and rotatably supported in the opposite frame member, a differential drive mechanism for driving the reel heads carried by one end frame, a second differential driving mechanism for driving the reel heads in the other frame member, and means for driving both of said differential mechanisms.

20. In a machine of the class described, the combination of a fixed frame member, a movable frame member, means for moving said movable frame member to adjust the distance between the same and said fixed frame member, a pair of reels each comprising a head supported in said fixed frame member, and in said movable frame member, respectively, a differential drive mechanism associated with said fixed frame member for driving said reel heads, a second differential driving mechanism associated with said movable frame member, also for driving said reel heads, and means for driving both of said differential mechanisms.

21. In a machine of the class described, the combination of a fixed frame member, a movable frame member opposite said first named frame member, and adjustable toward and away from the same, a supply reel and a receiving reel, the ends whereof are rotatably supported in said frame member, and differential driving mechanism for differentially driving the supply reel and the receiving reel.

In testimony whereof I hereunto affix my signature in the presence of two witnesses, this 12th day of January, 1915.

WALTER E. HOSCH.

Witnesses:
M. P. SMITH,
M. A. HANDEL.